US011983785B2

United States Patent
Ha

(10) Patent No.: US 11,983,785 B2
(45) Date of Patent: May 14, 2024

(54) METHOD, SYSTEM, AND NON-TRANSITORY COMPUTER-READABLE RECORDING MEDIUM FOR CONTROLLING A SERVING ROBOT

(71) Applicant: Bear Robotics, Inc., Redwood City, CA (US)

(72) Inventor: John Jungwoo Ha, Frisco, TX (US)

(73) Assignee: Bear Robotics, Inc., Redwood City, CA (US)

( * ) Notice: Subject to any disclaimer, the term of this patent is extended or adjusted under 35 U.S.C. 154(b) by 382 days.

(21) Appl. No.: 17/378,847

(22) Filed: Jul. 19, 2021

(65) Prior Publication Data
US 2023/0016435 A1    Jan. 19, 2023

(51) Int. Cl.
G06Q 50/12 (2012.01)
B25J 9/16 (2006.01)
G05B 19/4155 (2006.01)
G06N 20/00 (2019.01)

(52) U.S. Cl.
CPC .............. *G06Q 50/12* (2013.01); *B25J 9/163* (2013.01); *G05B 19/4155* (2013.01); *G06N 20/00* (2019.01); *G05B 2219/45084* (2013.01)

(58) Field of Classification Search
CPC ......... G06Q 50/12; G06N 20/00; B25J 9/163; G05B 19/4155; G05B 2219/45084
See application file for complete search history.

(56) References Cited

U.S. PATENT DOCUMENTS

| 10,134,022 B1* | 11/2018 | Edwards | G06Q 30/06 |
| 2019/0056751 A1* | 2/2019 | Ferguson | G05D 1/0231 |
| 2019/0378202 A1* | 12/2019 | Belke | G06F 16/9554 |
| 2020/0294060 A1* | 9/2020 | Cao | G06V 40/161 |
| 2021/0387350 A1* | 12/2021 | Oleynik | A47J 44/00 |
| 2021/0406815 A1* | 12/2021 | Mimassi | G06Q 10/063118 |
| 2022/0148000 A1* | 5/2022 | Mimassi | G16H 20/60 |

FOREIGN PATENT DOCUMENTS

| JP | 2016035703 A | 3/2016 |
| KR | 1020110011235 A | 2/2011 |
| KR | 101083700 B1 | 11/2011 |
| KR | 1020170140561 A | 12/2017 |
| KR | 1020210015577 A | 2/2021 |
| KR | 1020210033214 A | 3/2021 |
| KR | 1020210043306 A | 4/2021 |

* cited by examiner

*Primary Examiner* — Peter D Nolan
*Assistant Examiner* — Mikko Okechukwu Obioha
(74) *Attorney, Agent, or Firm* — Dinsmore & Shohl LLP; Yongsok Choi, Esq.

(57) ABSTRACT

A method for controlling a serving robot is provided. The method includes the steps of: determining a first time to request payment from a customer on the basis of identification information on the customer and information on an order of the customer acquired with respect to the customer; acquiring information on eating status of the customer at a second time associated with the first time; and adjusting at least one of the first time and the second time on the basis of at least one of the information on the eating status of the customer and information on an additional order of the customer additionally acquired with respect to the customer.

13 Claims, 4 Drawing Sheets

300

METHOD, SYSTEM, AND NON-TRANSITORY COMPUTER-READABLE RECORDING MEDIUM FOR CONTROLLING A SERVING ROBOT

FIELD OF THE INVENTION

The present invention relates to a method, system, and non-transitory computer-readable recording medium for controlling a serving robot.

BACKGROUND

Serving means providing objects including drinks or food to customers in a place such as a restaurant. In recent years, robots and the like have been developed and used for serving in place of, or rendering assistance to, waiters or waitresses. Such a robot usually functions to take food orders or carry out serving according to the orders, and may perform autonomous navigation using table position information or the like. The robot may comprise a transport means (including sensors for avoiding obstacles), a display means for menu output or order input, and the like. Further, the robot may include a means for placing or carrying food or food containers.

As an example of related conventional techniques, Korean Registered Patent Publication No. 10-1083700 discloses a restaurant serving robot system for taking orders in a restaurant and transporting a tray where ordered food is placed, the system comprising: an upper part including a pair of articulated robot arms which are synchronously driven, and a tray holding part rotatably coupled to a lower end of the articulated robot arms and configured to fix the tray; a lower part at a bottom part of which a robot moving part including a main wheel and one or more auxiliary wheels is provided; a middle part fixed to the lower part and rotatably connected to the upper part; and a control part configured to control the operations of the pair of articulated robot arms, the tray holding part, and the robot moving part, wherein the tray holding part comprises: a hand rotatably coupled to an end of the articulated robot arms; a fixing part provided at the hand to move upward and downward; a gripper positioned at a bottom part of the tray and coupled to the fixing part; a stopper positioned at a top part of the tray and coupled to the fixing part to face the gripper; a switch pressed by the fixing part which moves upward when the stopper is pressed by the tray at the same time the end of the articulated robot arms is driven downward; a spring contracted when the fixing part moves upward; and a gripper angle detection unit configured to detect an angle of the gripper.

Meanwhile, in a serving place such as a restaurant, payment may be requested from a customer before the customer leaves his/her seat after eating. In this case, it is necessary to monitor the customer's eating status and the like in order to request payment from the customer at an appropriate time. However, the techniques introduced so far as well as the above-described conventional technique have failed to suggest acquiring information on the customer's eating status at an appropriate time to ensure efficient monitoring, and causing payment to be requested from the costumer at an appropriate time.

In this connection, the inventor(s) present a technique for monitoring eating status of a customer efficiently and causing payment to be requested from the costumer at an appropriate time, by determining a first time to request payment from the customer on the basis of identification information on the customer and information on an order of the customer acquired with respect to the customer, acquiring information on eating status of the customer at a second time associated with the first time, and adjusting at least one of the first time and the second time on the basis of at least one of the information on the eating status of the customer and information on an additional order of the customer additionally acquired with respect to the customer.

SUMMARY OF THE INVENTION

One object of the present invention is to solve all the above-described problems in the prior art.

Another object of the invention is to: determine a first time to request payment from a customer on the basis of identification information on the customer and information on an order of the customer acquired with respect to the customer; acquire information on eating status of the customer at a second time associated with the first time; and adjust at least one of the first time and the second time on the basis of at least one of the information on the eating status of the customer and information on an additional order of the customer additionally acquired with respect to the customer.

Yet another object of the invention is to monitor eating status of a customer efficiently and cause payment to be requested from the costumer at an appropriate time.

The representative configurations of the invention to achieve the above objects are described below.

According to one aspect of the invention, there is provided a method for controlling a serving robot, the method comprising the steps of: determining a first time to request payment from a customer on the basis of identification information on the customer and information on an order of the customer acquired with respect to the customer; acquiring information on eating status of the customer at a second time associated with the first time; and adjusting at least one of the first time and the second time on the basis of at least one of the information on the eating status of the customer and information on an additional order of the customer additionally acquired with respect to the customer.

According to another aspect of the invention, there is provided a system for controlling a serving robot, the system comprising: a payment time determination unit configured to determine a first time to request payment from a customer on the basis of identification information on the customer and information on an order of the customer acquired with respect to the customer; an eating status monitoring unit configured to acquire information on eating status of the customer at a second time associated with the first time; and a payment time adjustment unit configured to adjust at least one of the first time and the second time on the basis of at least one of the information on the eating status of the customer and information on an additional order of the customer additionally acquired with respect to the customer.

In addition, there are further provided other methods and systems to implement the invention, as well as non-transitory computer-readable recording media having stored thereon computer programs for executing the methods.

According to the invention, it is possible to: determine a first time to request payment from a customer on the basis of identification information on the customer and information on an order of the customer acquired with respect to the customer; acquire information on eating status of the customer at a second time associated with the first time; and adjust at least one of the first time and the second time on the basis of at least one of the information on the eating status of the customer and information on an additional order of the customer additionally acquired with respect to the customer.

According to the invention, it is possible to monitor eating status of a customer efficiently and cause payment to be requested from the costumer at an appropriate time.

DETAILED DESCRIPTION OF THE INVENTION

Figure 1:
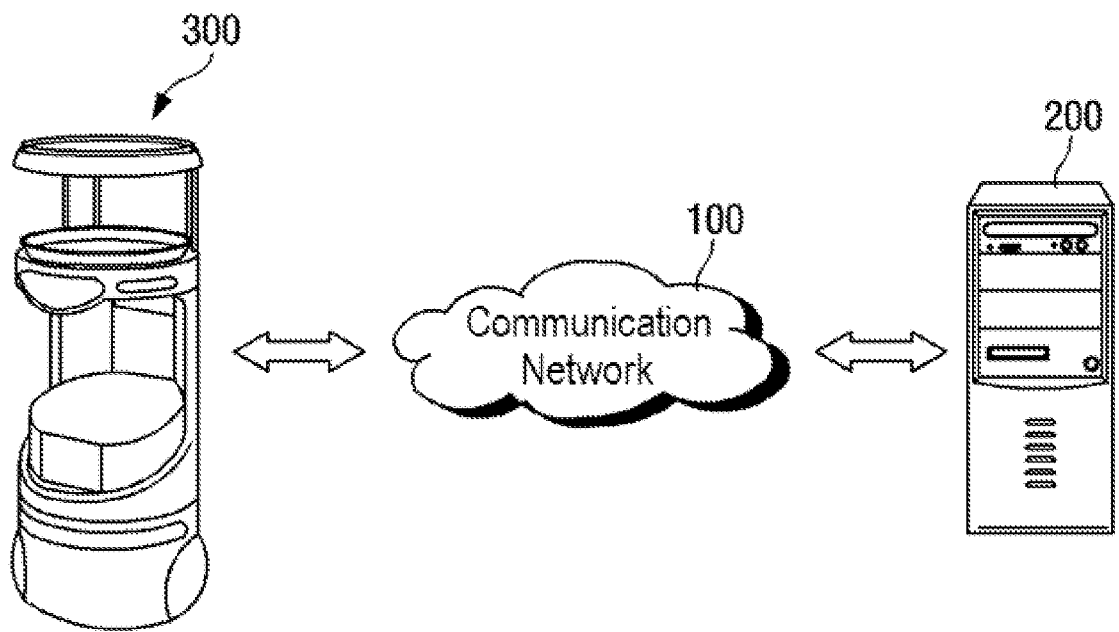
FIG. 1 schematically shows the configuration of an entire system for controlling a serving robot according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for controlling a serving robot according to one embodiment of the invention.

As shown in FIG. 1, the entire system according to one embodiment of the invention may comprise a communication network 100, a robot control system 200, and a serving robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, 5G communication, Bluetooth communication (including Bluetooth Low Energy (BLE) communication), infrared communication, and ultrasonic communication. As another example, the communication network 100 may be an optical communication network, at least a part of which may be implemented with a conventional communication scheme such as LiFi (Light Fidelity).

Next, the robot control system 200 according to one embodiment of the invention may function to: determine a first time to request payment from a customer on the basis of identification information on the customer and information on an order of the customer acquired with respect to the customer; acquire information on eating status of the customer at a second time associated with the first time; and adjust at least one of the first time and the second time on the basis of at least one of the information on the eating status of the customer and information on an additional order of the customer additionally acquired with respect to the customer.

The configuration and functions of the robot control system 200 according to the invention will be discussed in more detail below.

Next, the serving robot 300 according to one embodiment of the invention is a device capable of communicating with the robot control system 200 via the communication network 100 and performing predetermined functions or assigned tasks (e.g., serving food, retrieving containers, etc.) autonomously without any operation of a user (e.g., an employee or a customer), and may include a support configured to support at least one object. The serving robot 300 according to one embodiment of the invention may include at least one of a module (e.g., a grab or a robotic arm module) for loading and unloading an object (e.g., a food tray), an image acquisition module (e.g., a visible light camera or an infrared camera) for acquiring images of surroundings, a scanner module (e.g., a LIDAR sensor) for acquiring information on obstacles, a sound acquisition module (e.g., a microphone) for acquiring sounds of surroundings, a display and speaker module for providing images and sounds, and a drive module (e.g., a motor) for moving the serving robot 300.

For example, the serving robot 300 may have characteristics or functions similar to those of at least one of a guide robot, a transport robot, a cleaning robot, a medical robot, an entertainment robot, a pet robot, and an unmanned flying robot. Meanwhile, supporting of an object herein should be interpreted as encompassing supporting of a container for containing an object such as food, a means where the container may be placed (e.g., a tray), or the like.

Meanwhile, according to one embodiment of the invention, the serving robot 300 may include an application (not shown) for controlling the serving robot 300 according to the invention. The application may be downloaded from the robot control system 200 or an external application distribution server (not shown). According to one embodiment of the invention, the characteristics of the application may be generally similar to those of a payment time determination unit 210, an eating status monitoring unit 220, a payment time adjustment unit 230, a communication unit 240, and a control unit 250 of the robot control system 200 to be described below. Here, at least a part of the application may be replaced with a hardware device or a firmware device that may perform a substantially equal or equivalent function, as necessary.

Figure 3:
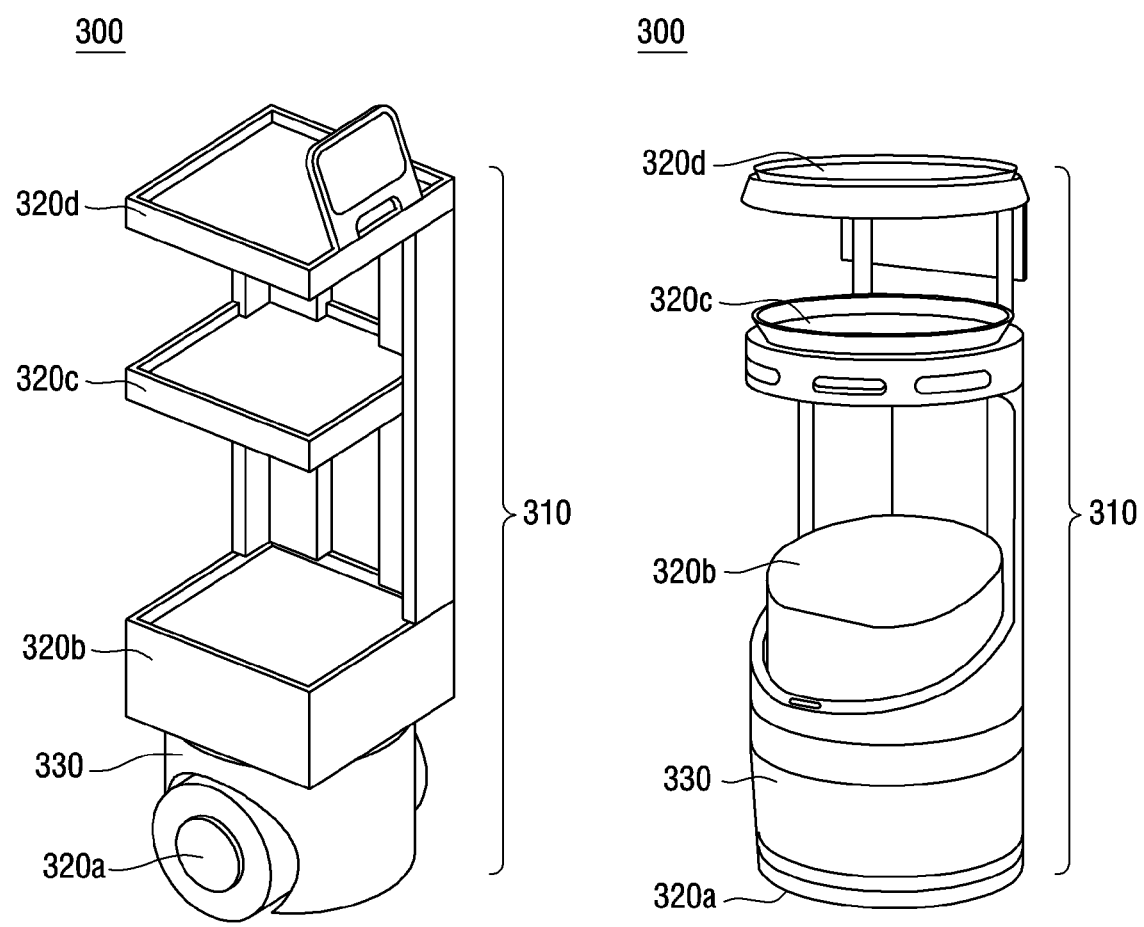
FIG. 3 illustratively shows the structure of a serving robot according to one embodiment of the invention.
Figure 4:
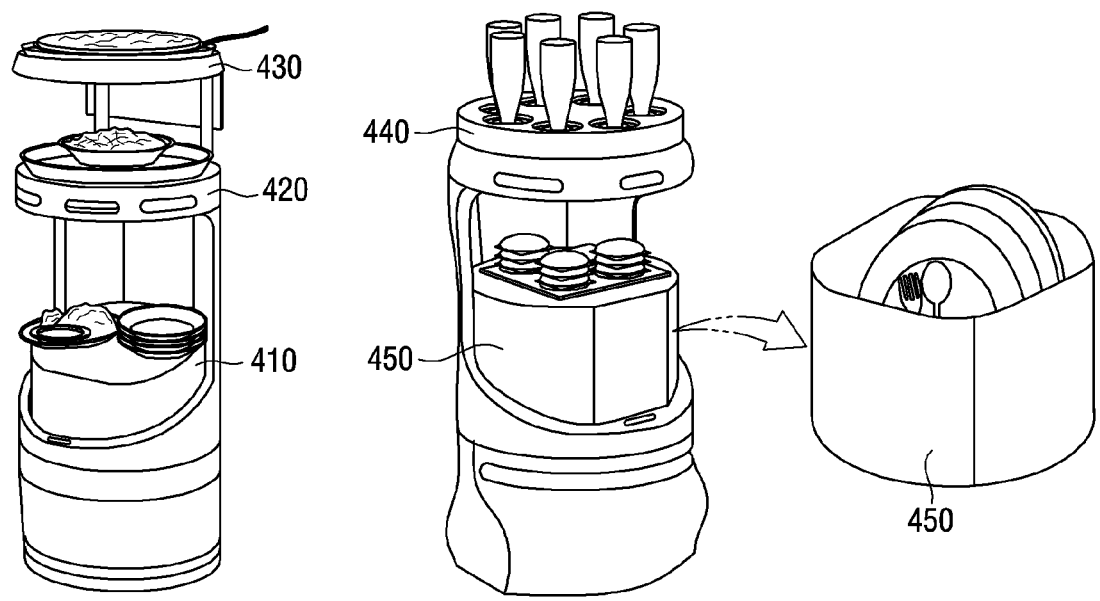
FIG. 4 illustratively shows the structure of a serving robot according to one embodiment of the invention.

FIGS. 3 and 4 illustratively show the structure of the serving robot 300 according to one embodiment of the invention.

Referring to FIG. 3, the serving robot 300 may comprise a main body 310, a drive unit 320a, and a processor 330.

First, the main body 310 according to one embodiment of the invention may be coupled to supports 320b, 320c, and 320d configured to support at least one object. According to one embodiment of the invention, the supports 320b, 320c, and 320d may be removably coupled for cleaning, replacement, or the like. Further, each of the supports 320b, 320c, and 320d may include a weight sensor (not shown) for sensing a weight supported by each of the supports 320b, 320c, and 320d. According to one embodiment of the invention, the weight sensor may be implemented using one or more strain gauges (e.g., three strain gauges, four strain gauges, or the like). In addition, according to one embodiment of the invention, the weight sensor may be coupled to the processor 330.

Further, the main body 310 according to one embodiment of the invention may include a photographing module (not shown) configured to photograph a spatial region above each of the supports 320b, 320c, and 320d, in place of or in addition to the weight sensor. Meanwhile, according to one embodiment of the invention, the photographing modules configured to photograph the spatial regions above the respective supports 320b, 320c, and 320d are not necessarily included in the main body 310, and at least some of the photographing modules may be installed on a structure in a serving place.

Meanwhile, the main body 310 according to one embodiment of the invention may include at least one loading space for loading an object. Further, according to one embodiment of the invention, the at least one loading space may include the supports 320b, 320c, and 320d. The object according to one embodiment of the invention may refer to all material objects that can be moved by the serving robot 300, and may encompass things, animals, and the like. For example, the object according to one embodiment of the invention may include a serving object such as food and a bussing object such as a container containing the food.

Referring to FIG. 4, the serving robot 300 according to one embodiment of the invention may include a first space 410 and a second space 420 for providing a serving object (i.e., serving) and collecting a bussing object (i.e., bussing). Further, the serving robot 300 may further include a third space 430 that is an expansion space provided via a removable pillar, and more loading spaces may be provided by adding more expansion spaces as needed. Further, the serving robot 300 may further include a tray 440 dedicated for the serving object or the bussing object. For example, the tray 440 may be configured such that a plurality of circular grooves are formed on its top side as seen from the top. Each of the circular grooves may be formed such that the lower part of a cup containing a drink is seated and easily fixed to some extent. The sizes of the circular grooves may be diverse. Further, the lower part of the first space 410 of the serving robot 300 may include a fourth space 450 that may be taken out through a lateral side of the serving robot 300. The fourth space 450 according to one embodiment of the invention may have a shape similar to a basket, such that an empty space is formed therein; a lateral side thereof is closed; a top side thereof is open; and a bottom side thereof is closed. However, the loading spaces of the serving robot 300 according to the invention are not necessarily limited to the above description, and may be diversely implemented as other types of loading spaces as long as the objects of the invention may be achieved.

Next, referring to FIG. 3 again, the drive unit 320a according to one embodiment of the invention may comprise a module for moving the main body 310 to other locations. For example, the drive unit 320a may include a module related to electrically, mechanically, or hydraulically driven wheels, propellers, or the like as the module for moving the main body 310 to other locations.

Next, the processor 330 according to one embodiment of the invention may be electrically connected to the drive unit 320a to perform a function of controlling the drive unit 320a (and may include a communication module for communicating with an external system). For example, the processor 330 may be a data processing device that are embedded in hardware and have circuits physically structured to perform codes included in a program or functions represented by instructions. For example, such a data processing device embedded in hardware may include a processing device such as a microprocessor, a central processing unit, a processor core, a multiprocessor, an application-specific integrated circuit (ASIC), and a field programmable gate array (FPGA).

Further, the processor 330 may perform the functions of at least one of the payment time determination unit 210, the eating status monitoring unit 220, and the payment time adjustment unit 230 of the robot control system 200 according to the invention (e.g., the corresponding functions may be modularized and included in the processor 330), and may function to control the drive unit 320a through communication with an external system (not shown) that performs the functions of at least one of the payment time determination unit 210, the eating status monitoring unit 220, and the payment time adjustment unit 230.

Specifically, the processor 330 may function to: determine a first time to request payment from a customer on the basis of identification information on the customer and information on an order of the customer acquired with respect to the customer; acquire information on eating status of the customer at a second time associated with the first time; and adjust at least one of the first time and the second time on the basis of at least one of the information on the eating status of the customer and information on an additional order of the customer additionally acquired with respect to the customer.

Configuration of the Robot Control System

Hereinafter, the internal configuration of the robot control system 200 crucial for implementing the invention and the functions of the respective components thereof will be discussed.

Figure 2:
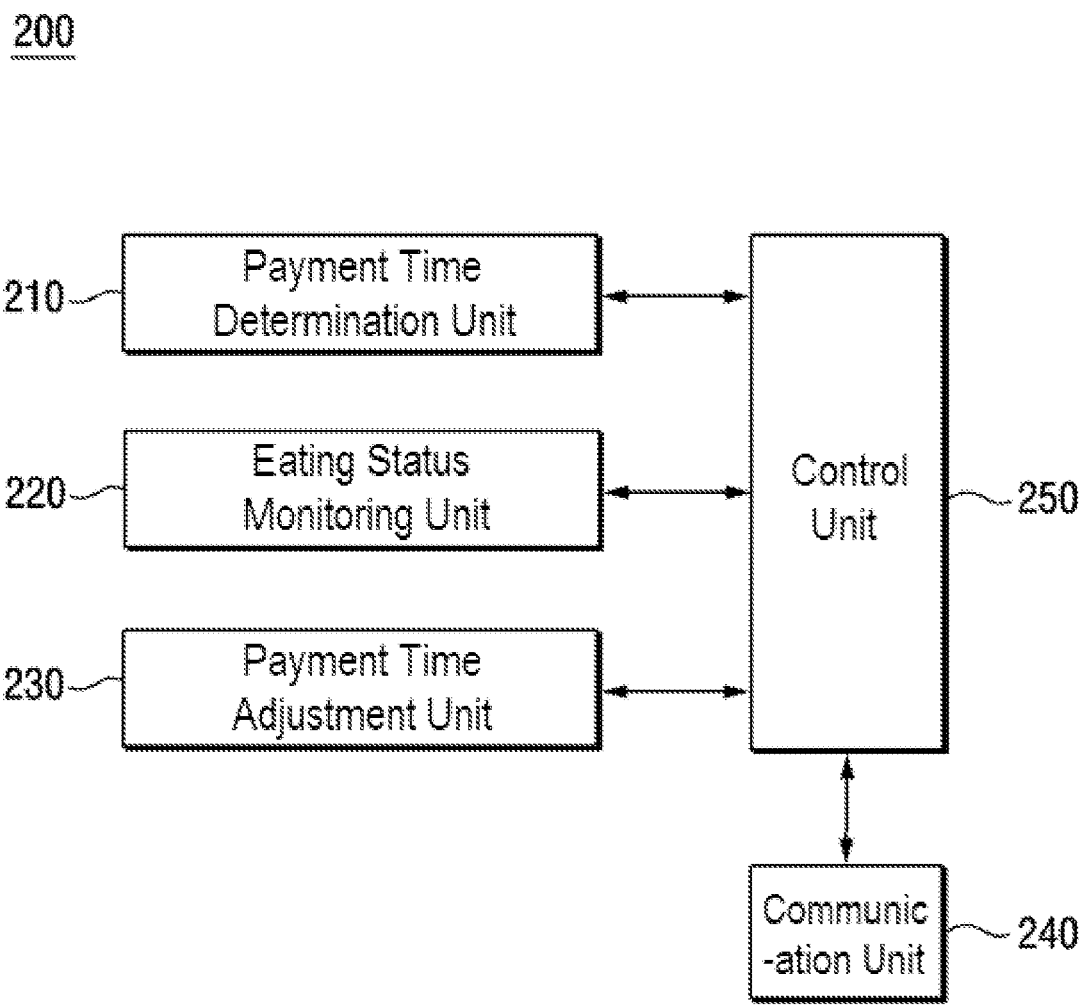
FIG. 2 specifically shows the internal configuration of a robot control system according to one embodiment of the invention.

FIG. 2 specifically shows the internal configuration of the robot control system 200 according to one embodiment of the invention.

As shown in FIG. 2, the robot control system 200 according to one embodiment of the invention may comprise a payment time determination unit 210, an eating status monitoring unit 220, a payment time adjustment unit 230, a communication unit 240, and a control unit 250. According to one embodiment of the invention, at least some of the payment time determination unit 210, the eating status monitoring unit 220, the payment time adjustment unit 230, the communication unit 240, and the control unit 250 may be program modules that communicate with an external system. The program modules may be included in the robot control system 200 in the form of operating systems, application program modules, and other program modules, while they may be physically stored in a variety of commonly known storage devices. Further, the program modules may also be stored in a remote storage device that may communicate with the robot control system 200. Meanwhile, such program modules may include, but are not limited to, routines, subroutines, programs, objects, components, and data structures for performing specific tasks or executing specific abstract data types according to the invention as will be described below.

Meanwhile, the above description is illustrative although the robot control system 200 has been described as above, and it will be apparent to those skilled in the art that at least a part of the components or functions of the robot control system 200 may be implemented or included in the serving robot 300 or an external system (not shown), as necessary. Further, in some cases, all of the functions and components of the robot control system 200 may be implemented or included in the serving robot 300.

First, the payment time determination unit 210 according to one embodiment of the invention may function to acquire identification information on a customer and information on an order of the customer with respect to the customer. Meanwhile, it should be understood that the term "customer" herein may refer to a specific person, but may also refer to a group including the specific person (i.e., the specific person and his/her party).

Specifically, according to one embodiment of the invention, the identification information on the customer may include information on composition of the customer (e.g. the customer's gender, headcount, age, etc.), information on identity of the customer (if the customer's identity can be specifically recognized), and the like. Further, according to one embodiment of the invention, the information on the customer's order may include food ordered by the customer (hereinbefore and hereinafter, food includes drinks), a time when the food is ordered, a location of the customer (e.g., a location of a table where the customer is seated), and the like.

However, the identification information on the customer and the information on the customer's order according to one embodiment of the invention are not limited to the foregoing and may be diversely changed as long as the objects of the invention may be achieved.

Meanwhile, the payment time determination unit 210 according to one embodiment of the invention may acquire at least one of the identification information on the customer, the information on the customer's order, information on eating status of the customer (to be described below), and information on an additional order of the customer (to be described below), using an image acquisition module (e.g., a visible light camera or an infrared camera) for acquiring images of surroundings, a sound acquisition module (e.g., a microphone) for acquiring sounds of surroundings, and the like, and the above modules may be included in the serving robot 300 or installed on a structure in a serving place. In addition, some of the identification information on the customer, the information on the customer's order, the information on the customer's eating status, and the information on the customer's additional order may be inputted by a user. For example, when information indicating that a specific customer has ordered particular food is inputted to a point of sale (POS) system or the like by an employee, the payment time determination unit 210 according to one embodiment of the invention may acquire the inputted information as information on the specific customer's order.

Further, the payment time determination unit 210 according to one embodiment of the invention may determine a first time to request payment from the customer on the basis of the identification information on the customer and the information on the customer's order acquired with respect to the customer as above.

Specifically, according to one embodiment of the invention, the first time to request payment from the customer may be a time associated with when the customer is to finish eating. For example, according to one embodiment of the invention, the first time may refer to a time when a predetermined amount of time has elapsed from when the customer has ordered food, a time when the customer is estimated to finish eating, a time earlier or later by a predetermined amount of time than when the customer is estimated to finish eating, or the like.

More specifically, the payment time determination unit 210 according to one embodiment of the invention may estimate a time when the customer is to finish eating, on the basis of the identification information on the customer (e.g., the customer's gender, headcount, age, etc.) and the information on the customer's order (e.g., food ordered by the customer, a time when the food is ordered, etc.), and may determine the first time on the basis of the estimated time. Further, the payment time determination unit 210 according to one embodiment of the invention may carry out the above estimation using a machine learning-based payment time learning model, which is trained using identification information on at least one customer, information on an order of the at least one customer, and a time when payment is actually made by the at least one customer as training data. To this end, the payment time determination unit 210 according to one embodiment of the invention may train the payment time learning model using various machine learning-based algorithms in a manner to reduce a difference between the first time determined as above and the time when payment is actually made by the customer, so that payment may be requested from the customer at a more appropriate time.

Meanwhile, according to one embodiment of the invention, the first time to request payment from the customer may be customized by a user. For example, the payment time determination unit 210 according to one embodiment of the invention may support a user to customize the first time by providing the user with setting information necessary for the determination of the first time (e.g., information on how much earlier or later payment is to be requested than when the customer is estimated to finish eating).

Next, when the first time to request payment from the customer is determined by the payment time determination unit 210 according to one embodiment of the invention, the eating status monitoring unit 220 according to one embodiment of the invention may function to acquire information on eating status of the customer at a second time associated with the first time.

Specifically, according to one embodiment of the invention, the second time associated with the first time may refer to a time to acquire the information on the customer's eating status, which is information necessary to actually request payment from the customer. That is, since the first time may differ from a time to actually request payment from the customer depending on the customer's eating status even if the first time is determined by the payment time determination unit 210 according to one embodiment of the invention, the eating status monitoring unit 220 according to one embodiment of the invention needs to acquire the information on the customer's eating status in order to enable adjustment of the first time (to be described below). However, since inefficiency may occur in operating the serving robot 300 if the information on the customer's eating status is acquired too early or too frequently, the eating status monitoring unit 220 according to one embodiment of the invention may acquire the information on the customer's eating status at a time when the inefficiency may be minimized, i.e., at the second time.

Meanwhile, according to one embodiment of the invention, the information on the customer's eating status may include information on an extent to which the customer has eaten (i.e., how much the ordered food has been eaten), an extent to which the customer's cup (or bottle) contains a drink, an amount of time having elapsed from when the food ordered by the customer is provided, and the like. However, the information on the customer's eating status according to one embodiment of the invention is not limited to the foregoing and may be diversely changed as long as the objects of the invention may be achieved.

Meanwhile, the eating status monitoring unit 220 according to one embodiment of the invention may determine a serving robot 300 to acquire the information on the customer's eating status at the second time, from among at least one serving robot 300, on the basis of information on task status of the at least one serving robot 300, and may appropriately control the determined serving robot 300 so that the serving robot 300 may acquire the information on the customer's eating status at the second time.

Specifically, according to one embodiment of the invention, the information on the task status of the serving robot 300 may include a location of the serving robot 300, a task assigned to the serving robot 300 (e.g., information on a service to be provided by the serving robot 300, a customer to whom the service is to be provided, and a time when the service is to be provided), a travel route of the serving robot 300, a destination of the serving robot 300, and the like. However, the information on the task status of the serving robot 300 according to one embodiment of the invention is not limited to the foregoing and may be diversely changed as long as the objects of the invention may be achieved.

For example, the eating status monitoring unit 220 according to one embodiment of the invention may determine a serving robot 300 closest to the customer at the second time as the serving robot 300 to acquire the information on the customer's eating status.

As another example, the eating status monitoring unit 220 according to one embodiment of the invention may determine a serving robot 300 closest to the customer, from among at least one serving robot 300 capable of acquiring the information on the customer's eating status at the second time, as the serving robot 300 to acquire the information on the customer's eating status, with reference to a task assigned to the at least one serving robot 300.

As yet another example, the eating status monitoring unit 220 according to one embodiment of the invention may calculate a cost increased by changing a travel route of at least one serving robot 300 to a travel route where the information on the customer's eating status may be acquired at the second time (e.g., an extent to which time required to arrive at a destination increases), with reference to a travel route of the at least one serving robot 300. Further, the eating status monitoring unit 220 according to one embodiment of the invention may determine a serving robot 300 for which the calculated cost is the lowest, from among the at least one serving robot 300, as the serving robot 300 to acquire the information on the customer's eating status at the second time.

Next, the payment time adjustment unit 230 according to one embodiment of the invention may function to additionally acquire information on an additional order of the customer with respect to the customer.

Specifically, according to one embodiment of the invention, the information on the customer's additional order may include food additionally ordered by the customer, a time when the food is ordered, a location of the customer, and the like. However, the information on the customer's additional order according to one embodiment of the invention is not limited to the foregoing and may be diversely changed as long as the objects of the invention may be achieved.

Further, the payment time adjustment unit 230 according to one embodiment of the invention may adjust at least one of the first time to request payment from the customer and the second time associated with the first time, on the basis of at least one of the information on the customer's eating status acquired by the eating status monitoring unit 220 according to one embodiment of the invention and the information on the customer's additional order additionally acquired as above.

For example, when it is decided that the customer has placed an additional order before the second time, the payment time adjustment unit 230 according to one embodiment of the invention may adjust both the first time and the second time to be delayed.

As another example, when it is decided that the customer has placed an additional order after the second time, the payment time adjustment unit 230 according to one embodiment of the invention may adjust the first time to be delayed, or may adjust the second time to be delayed in addition to delaying the first time, so that the information on the customer's eating status may be acquired again.

As yet another example, when it is decided that the customer's eating speed is slower than a predetermined level, the payment time adjustment unit 230 according to one embodiment of the invention may adjust at least one of the first time and the second time to be delayed.

Meanwhile, the payment time adjustment unit 230 according to one embodiment of the invention may cause payment to be requested from the customer at the first time adjusted as above.

For example, the payment time adjustment unit 230 according to one embodiment of the invention may cause a serving robot 300 closest to the customer at the adjusted first time to request payment from the customer, or to signal at least one nearby employee to request payment from the customer using light, sound, or the like.

Next, the communication unit 240 according to one embodiment of the invention may function to enable data transmission/reception from/to the payment time determination unit 210, the eating status monitoring unit 220, and the payment time adjustment unit 230.

Lastly, the control unit 250 according to one embodiment of the invention may function to control data flow among the payment time determination unit 210, the eating status monitoring unit 220, the payment time adjustment unit 230, and the communication unit 240. That is, the control unit 250 according to one embodiment of the invention may control data flow into/out of the robot control system 200 or data flow among the respective components of the robot control system 200, such that the payment time determination unit 210, the eating status monitoring unit 220, the payment time adjustment unit 230, and the communication unit 240 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method performed in a system for controlling a serving robot, the system comprising one or more processors and the method comprising the steps of:
    by the one or more processors, determining a first time to request payment from a customer on the basis of identification information on the customer and information on an order of the customer acquired with respect to the customer, the identification information on the customer and the information on the order of the customer being acquired by at least one of an image acquisition module and a sound acquisition module of the serving robot;
    by the one or more processors, causing a drive module of the serving robot to move the serving robot, and causing at least one of the image acquisition module and the sound acquisition module of the serving robot to acquire information on eating status of the customer at a second time associated with the first time; and
    by the one or more processors, adjusting at least one of the first time and the second time on the basis of at least one of the information on the eating status of the customer and information on an additional order of the customer additionally acquired with respect to the customer.

2. The method of claim 1, wherein in the causing step, the serving robot to acquire the information on the customer's eating status at the second time is determined from among at least one serving robot, on the basis of information on task status of the at least one serving robot.

3. The method of claim 2, wherein the information on the task status of the at least one serving robot includes a travel route of the at least one serving robot, and wherein in the causing step, a serving robot for which a cost increased by changing the travel route is the lowest is determined from among the at least one serving robot as the serving robot to acquire the information on the customer's eating status at the second time, on the basis of the travel route of the at least one serving robot.

4. The method of claim 1, wherein in the determining step, the first time is determined using a machine learning-based payment time learning model trained on the basis of identification information on at least one customer, information on an order of the at least one customer, and a time when payment is actually made by the at least one customer.

5. The method of claim 1, wherein in the determining step, the determined first time is allowed to be customized by a user.

6. The method of claim 1, wherein in the adjusting step, payment is requested from the customer at the adjusted first time.

7. A non-transitory computer-readable recording medium having stored thereon a computer program for executing the method of claim 1.

8. A system for controlling a serving robot, the system comprising:
    one or more processors configured to:
    determine a first time to request payment from a customer on the basis of identification information on the customer and information on an order of the customer acquired with respect to the customer, the identification information on the customer and the information on the order of the customer being acquired by at least one of an image acquisition module and a sound acquisition module of the serving robot;
    cause a drive module of the serving robot to move the serving robot, and cause at least one of the image acquisition module and the sound acquisition module of the serving robot to acquire information on eating status of the customer at a second time associated with the first time; and
    adjust at least one of the first time and the second time on the basis of at least one of the information on the eating status of the customer and information on an additional order of the customer additionally acquired with respect to the customer.

9. The system of claim 8, wherein the one or more processors are configured to determine a serving robot to acquire the information on the customer's eating status at the second time, from among at least one serving robot, on the basis of information on task status of the at least one serving robot.

10. The system of claim 9, wherein the information on the task status of the at least one serving robot includes a travel route of the at least one serving robot, and
    wherein the one or more processors are configured to determine a serving robot for which a cost increased by changing the travel route is the lowest, from among the at least one serving robot, as the serving robot to acquire the information on the customer's eating status at the second time, on the basis of the travel route of the at least one serving robot.

11. The system of claim 8, wherein the one or more processors are configured to determine the first time using a machine learning-based payment time learning model trained on the basis of identification information on at least one customer, information on an order of the at least one customer, and a time when payment is actually made by the at least one customer.

12. The system of claim 8, wherein the one or more processors are configured to allow the determined first time to be customized by a user.

13. The system of claim 8, wherein the one or more processors are configured to cause payment to be requested from the customer at the adjusted first time.

\* \* \* \* \*